United States Patent [19]
Haskell

[11] 3,873,612
[45] Mar. 25, 1975

[54] PRODUCTION OF TEREPHTHALIC ACID
[75] Inventor: Donald M. Haskell, Bartlesville, Okla.
[73] Assignee: Phillips Petroleum Company, Bartlesville, Okla.
[22] Filed: June 1, 1971
[21] Appl. No.: 148,737

[52] U.S. Cl............................. 260/525, 260/515 P
[51] Int. Cl............................................. C07c 63/26
[58] Field of Search ....................... 260/515 P, 525

[56] References Cited
UNITED STATES PATENTS
2,841,615 7/1958 Schutt et al......................... 260/515
2,846,468 8/1958 York.................................... 260/515

Primary Examiner—James A. Patten

[57] ABSTRACT

A mixture produced by the reaction of dipotassium terephthalate and benzoic acid is subjected to a series of phase separation steps at succeedingly higher temperatures to recover from said mixture a high purity terephthalic acid product.

3 Claims, 1 Drawing Figure

PATENTED MAR 25 1975    3,873,612
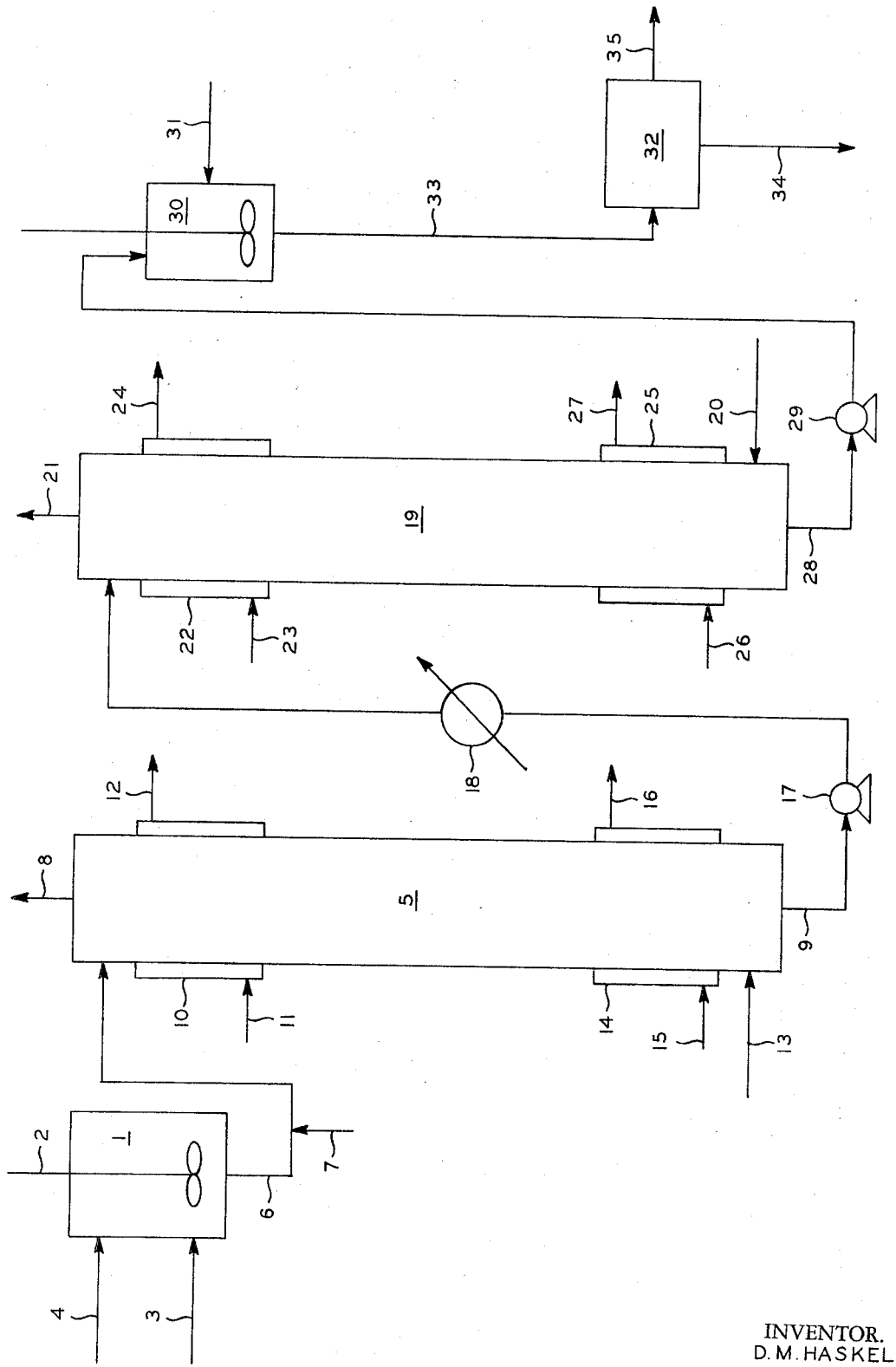
INVENTOR.
D. M. HASKELL
BY Young & Quigg
ATTORNEYS

PRODUCTION OF TEREPHTHALIC ACID

This invention relates to the production of terephthalic acid by the reaction of dipotassium terephthalate with benzoic acid to obtain crude terephthalic acid crystals. This invention further relates to the purification of terephthalic acid obtained by the reaction of dipotassium terephthalate with benzoic acid.

It is well known in the art that dipotassium terephthalate can be produced by the disproportionation of potassium benzoate using zinc benzoate to catalyze the reaction. See, for example, U.S. Pat. No. 2,823,230. It is also known that terephthalic acid can be produced by the reaction of dipotassium terephthalate with benzoic acid. See, for example, U.S. Pat. No. 2,930,813. When dipotassium terephthalate is reacted with benzoic acid to produce terephthalic acid, the reaction proceeds in two steps as follows:

$$K_2TP + BZA \rightarrow KHTP + KBZ \quad (1)$$

$$KHTP + BZA \rightleftarrows TPA + KBZ \quad (2)$$

wherein $K_2TP$ is dipotassium terephthalate, BZA is benzoic acid, KHTP is potassium hydrogen terephthalate (also referred to herein as potassium acid terephthalate), KBZ is potassium benzoate and TPA is terephthalic acid. The conversion of dipotassium terephthalate to terephthalic acid by the above-indicated reactions is known in the art as a metathesis reaction. As indicated by equations (1) and (2), this reaction proceeds in two steps wherein while step (1) proceeds nearly to completion, that is, all or substantially all of the dipotassium terephthalate is converted to potassium acid terephthalate, step (2) is reversible and, accordingly, the potassium acid terephthalate is only about 80 percent converted to terephthalic acid under equilibrium conditions, that is, under conditions where the products of the reaction are not removed from the reaction vessel as they are formed.

Terephthalic acid is of considerable importance in industry as a starting material in such applications as the manufacture of synthetic fibers of the polyester type; therefore, there has been considerable activity in the art directed toward the economic and convenient production of large quantities of relatively pure terephthalic acid. One problem encountered in relation to the preparation of terephthalic acid in accordance with equations (1) and (2) above has been in obtaining complete reaction of the potassium acid terephthalate in order to maximize the production of terephthalic acid from the dipotassium terephthalate starting material and in the separation of the terephthalic acid product from the crude reaction mixture.

It is thus an object of this invention to provide a process for the production of high purity terephthalic acid. It is another object of this invention to provide a process for the efficient production of terephthalic acid by the reaction of dipotassium terephthalate with benzoic acid.

In accordance with my invention there is provided a process for the production of terephthalic acid which comprises reacting dipotassium terephthalate with benzoic acid to produce a reaction mixture, phase separating and recovering benzoic acid, potassium acid terephthalate, and terephthalic acid from the reaction mixture which is comprised of potassium benzoate, benzoic acid, potassium acid terephthalate, and terephthalic acid, reacting the benzoic acid with the potassium acid terephthalate in the presence of the terephthalic acid to produce a second reaction mixture containing an additional quantity of terephthalic acid and, thereafter, phase separating and recovering the terephthalic acid from the second reaction mixture.

By this invention there is produced a terephthalic acid product of high purity and, in addition, the reaction in equation (2) above proceeds to substantial completion thus making unnecessary the removal of little, if any, unreacted potassium acid terephthalate.

In further accordance with my invention a reaction mixture comprising a slurry of benzoic acid, potassium acid terephthalate, potassium benzoate and terephthalic acid, wherein the potassium benzoate is in the dissolved state and the benzoic acid, potassium acid terephthalate and terephthalic acid are in the undissolved state, is introduced into a first purification zone wherein the reaction mixture is treated with water at a temperature sufficient to maintain the benzoic acid, potassium acid terephthalate and terephthalic acid substantially in the undissolved state and the potassium benzoate substantially in the dissolved state accompanied by the separation and removal of the dissolved material to thereby produce a second slurry comprised of benzoic acid, potassium acid terephthalate and terephthalic acid in the undissolved state. The second slurry is then introduced into a second purification zone wherein it is treated with water at a temperature sufficient to dissolve the potassium acid terephthalate and benzoic acid which then react to produce additional quantities of terephthalic acid, which immediately precipitates, and potassium benzoate which is removed from the second purification zone in the dissolved state. The terephthalic acid is simultaneously removed from the second zone in the undissolved state in a third slurry and thereafter dried to thus produce a terephthalic acid of high purity.

My invention can be further understood by reference to the accompanying drawing and the following description.

Referring now to the drawing, which is a schematic diagram showing a preferred embodiment of this invention, there is introduced into stirred reactor 1 equipped with stirring means 2 benzoic acid via line 3 and dipotassium terephthalate dissolved in water via line 4. In stirred reactor 1 the benzoic acid and dipotassium terephthalate solution are heated to a temperature in the range of 150°F to 300°F, preferably about 190°F with stirring for a time period of about 15 minutes during which time the benzoic acid and dipotassium terephthalate react and reach equilibrium. In reactor 1 a two-step reaction occurs in which (1) dipotassium terephthalate reacts with benzoic acid to yield potassium acid terephthalate and potassium benzoate and thereafter (2) the potassium acid terephthalate reacts with benzoic acid to yield terephthalic acid and potassium benzoate. Upon reaching equilibrium in reactor 1, essentially all the dipotassium terephthalate is converted to potassium acid terephthalate but only about 75 to 80 percent of the potassium acid terephthalate reacts with benzoic acid to produce terephthalic acid. Accordingly, at equilibrium there is a reaction mixture in reactor 1 comprised essentially of potassium benzoate, benzoic acid, potassium acid terephthalate and terephthalic acid. This reaction mixture is in the form of an aqueous slurry having dissolved material and undissolved material wherein the solids portion of the slurry, that is the undissolved material, is comprised of benzoic acid, potassium acid terephthalate, and terephthalic acid. The dissolved portion of the slurry is comprised essentially of potassium benzoate with a minor portion of benzoic acid also being present in solution.

The slurried reaction mixture from reactor 1 is introduced into settled bed wash column 5 via line 6. Prior to the introduction of the reaction mixture into column 5, it is diluted with water to produce a slurry containing in the range of about 5 to 50 weight percent solids, preferably 15 weight percent solids. The water diluent is introduced into line 6 via line 7. In addition, the diluted reaction mixture is cooled from the reactor temperature to a temperature in the range of 100° to 150°F, preferably 120°F. This cooling can be effected by any means such as by introducing chilled water into line 6 via line 7 to thus both cool and dilute the reaction mixture at the same time.

In settled bed wash column 5, the reaction mixture from reactor 1, which is introduced into the upper portion of column 5, undergoes phase separation wherein the undissolved material containing the above-mentioned solid constituents settles to the lower portion of column 5 and the potassium benzoate-containing dissolved material accumulates in the upper portion of column 5.

Potassium acid terephthalate is relatively insoluble in a relatively concentrated aqueous solution of potassium benzoate at temperatures in the range of 100° to 150°F, which is the situation in the upper portion of column 5; however, potassium acid terephthalate is appreciably soluble in relatively dilute aqueous solutions of potassium benzoate at temperatures in the range of 100° to 150°F. Since the concentration of potassium benzoate in solution decreases from the upper portion of column 5 to the lower portion of column 5, it becomes necessary to operate the lower portion of column 5 at a temperature less than the upper portion of column 5 to prevent dissolution of potassium acid terephthalate into water containing a relatively low concentration of potassium benzoate. Therefore, to promote the solubility of potassium benzoate and to maintain the remaining constituents of the reaction mixture in the solid state, column 5 is operated under a temperature gradient with the upper portion of column 5 being maintained at a temperature in the range of 100° to 150°F, which temperature is higher than the lower portion of column 5. This temperature gradient is for the purpose of facilitating the removal of potassium beenzoate, in solution, from the upper portion of column 5 via line 8, and for the removal of the remaining solid constituents of the reaction mixture from the lower portion benzoate, column 5 via line 9.

In this preferred embodiment it has been found that column 5 operates most efficiently with the upper portion being maintained at a temperature of about 120°F and the lower portion being maintained at a temperature of about 80°F. With the upper portion of column 5 being maintained at a temperature of approximately 120°F, there is effected maximum removal of potassium benzoate with minimum removal of potassium acid terephthalate and benzoic acid. As mentioned previously, potassium benzoate is removed from column 5 via line 8 for further processing, not shown.

The temperature of the upper portion of column 5 is maintained at the desirable level by any means known in the art such as by heating jacket 10 through which is passed a heating medium which is introduced into jacket 10 via line 11 and removed from jacket 10 via line 12.

In order to maintain the benzoic acid, the potassium acid terephthalate and the terephthalic acid in the undissolved state, the lower portion of column 5 is maintained at a temperature in the range of 50° to 100°F and preferably at a temperature of 80°F. Since benzoic acid and potassium acid terephthalate are relatively insoluble in water at 80°F, these constituents as well as the terephthalic acid are maintained in the undissolved state in the lower portion of column 5 by introducing into the lower portion of column 5 via line 13 water at a temperature of approximately 80°F. This water traverses column 5 in an upward direction in countercurrent contact with the undissolved material of the reaction mixture which is settling as solid particles from the upper portion of column 5. The rising water dissolves out and removes residual portions of potassium benzoate which may be entrained in the undissolved state and also serves to cool those constituents desired to be maintained in the solid state. The rising water than exits column 5 via line 8, carrying with it the dissolved potassium benzoate impurity.

The lower portion of column 5 can be maintained at the desired temperature by any means known in the art such as by cooling jacket 14 through which is passed a heat exchange medium which is introduced into jacket 14 via line 15 and which exits jacket 14 via line 16.

The material in the lower portion of clumn 5, which is a slurry comprised essentially of benzoic acid, potassium acid terephthalate and terephthalic acid in undissolved state, is passed from the lower portion of column 5 via line 9, pump 17 and heating means 18 and introduced into the upper portion of a second settled bed wash column 19. As previously mentioned, the slurry leaving the lower portion of column 5 is at a temperature of approximately 80°F. In order to complete the conversion of the original dipotassium terephthalate to terephthalic acid it is necessary to place the potassium acid terephthalate and benzoic acid, both of which are in solid state in the lower portion of column 5, in solution such that these compounds can react to form terephthalic acid and potassium benzoate. This solution is conveniently effected by heating the slurry in heating means 18 to a temperature in the range of 150° to 250°F, preferably 190°F, and then introducing the stream in line 9 into column 19 at this now higher temperature.

In column 19 the reaction between potassium acid terephthalate and benzoic acid is completed, in the absence of the potassium benzoate which was formed in reactor 1 and with the terephthalic acid which was formed in reactor 1 being present as a solid, thus forming additional terephthalic acid and potassium benzoate. The terephthalic acid, being insoluble, settles to the lower portion of column 19 and the potassium benzoate thus formed, being soluble, remains in the upper portion of column 19. Water, at a temperature of approximately 100°F, is introduced into the lower portion of column 19 via line 20 and rises through column 19 in countercurrent contact with the settling material, which is comprised essentially of terephthalic acid, to remove from the solid terephthalic acid impurities such as unreacted potassium acid terephthalate and benzoic acid and potassium benzoate. These impurities are then removed from the upper portion of column 19 via line 21 for further processing not shown.

Column 19 is also operated under a temperature gradient with the upper portion of column 19 being maintained at a temperature higher than the lower portion of column 19. The upper portion of column 19 is desirably maintained at a temperature in the range of 150° to 250°F, preferably 190°F. This can be accomplished by any means known in the art such as by heating jacket 22 through which is passed a heating medium which is introduced into heating jacket 22 via line 23 and which leaves heating jacket 22 via line 24. In addition, it is desirable to maintain the lower portion of column 19 at a lower temperature in the range of 75° to 150°F, preferably 100°F. This can be accomplished by any means known in the art such as by heating jacket 25 through which is passed a heating medium which is introduced into heating jacket 25 via line 26 which exits heating jacket 25 via line 27. The higher temperature in the upper portion of column 19 is desirable in order to hasten the chemical reaction to completion, but the lower temperature in lower portion of column 19 is desirable in order to minimize the solubility of terephthalic acid in the wash water introduced via line 20.

The contents of the lower portion of column 19 are comprised of a slurry of solid terephthalic acid in water. This slurry also contains minor portions of impurities such as benzoic acid and potassium acid terephthalate. This slurry is removed from column 19 via line 28 and pump 29 and introduced into stirred wash tank 30. Water is introduced via line 31 and the resulting dilute slurry in tank 30 is stirred at a temperature in the range of 300° to 450°F, preferably about 380°F. Additional soluble potassium benzoate is thus removed from the solid terephthalic acid by the solvent action of the hot water. The slurry is then passed from tank 30 to filter 32 via line 33 wherein the solid terephthalic acid is recovered and removed via line 34 with the dissolved leaving in an aqueous stream via line 35. The solid terephthalic acid crystals in line 34 can be reslurried with hot water and again filtered for additional purification if desired.

The above-described process is a method for the complete conversion of dipotassium terephthalate to terephthalic acid which proceeds according to the following reactions:

1. Dipotassium terephthalate + benzoic acid → Potassium acid terephthalate + potassium benzoate
2. Potassium acid terephthalate + benzoic acid ⇌ terephthalic acid + potassium benzoate From equations (1) and (2) it is seen that potassium benzoate must be continuously removed in order to promote the complete conversion of dipotassium terephthalate to terephthalic acid. By the process of this invention equation (1) with the essentially complete conversion of dipotassium terephthate is accomplished in reactor 1. In column 5 the different solubilities of potassium benzoate, benzoic acid and potassium acid terephthalate are taken advantage of in order to remove dissolve potassium benzoate from column 5 via line 8 and undissolved benzoic acid, potassium acid terephthalate and terephthalic acid from column 5 via line 9. In column 19, reaction (2) is completed in which potassium acid terephthalate is reacted with benzoic acid to complete the formation of terephthalic acid. In column 19 the differing solubilities of potassium acid terephthalate, benzoic acid, potassium benzoate and terephthalic acid are taken advantage of whereby the temperature in column 19 is raised to a level necessary to dissolve potassium acid terephthalate and benzoic acid to promote their solution whereby they react to form terephthalic acid; however, terephthalic acid, not being soluble, settles to the lower portion of column 19 with removal of dissolved potassium benzoate formed in this second reaction along with unreacted potassium acid terephthalate via line 21.

It is thus seen that reactions (1) and (2) are conducted in a series of processing steps involving succeeding solid liquid phase separation steps with water washing, each succeeding step being conducted at a successively higher temperature to thereby take advantage of the differing solubilities of the compounds and reactants involved in the process. Thus, reactor 1 could discharge into a thickener wherein solids settle to the bottom and liquid containing solubles are removed from the top with the solids passing to a heated, stirred tank, followed by another thickener followed by another heating step and followed by still another thickening step wherein each thickening and heating step is conducted at a higher temperature than the preceding step.

The following example is provided to move fully explain the process of this invention; however, it should not be construed to limit the scope thereof.

Referring again to the drawing, 640 grams of dipotassium terephthalate dissolved in 4,000 grams of water was introduced into reactor 1 via line 4. Benzoic acid in the amount of 904 grams was introduced into reactor 1 via line 3. The contents of the reactor were heated to 190°F and stirred for about 15 minutes during which time the reaction between the dipotassium terephthalate and benzoic acid reached a state of equilibrium wherein essentially all of the dipotassium terephthalate was converted to potassium acid terephthalate but only 75–80 percent of the potassium acid terephthalate was converted to terephthalic acid. The contents of reactor 1, which were in the state of a creamy slurry with the terephthalic acid and potassium acid terephthalate being present as solids, the potassium benzoate being in solution, and the benzoic acid being partly dissolved but the majority of which being in the solid state, were introduced into column 5 via line 6 after being first diluted with 4,000 grams of water which was introduced into line 6 via line 7 at a temperature of about 45°F to produce a slurry containing about 16 weight percent solids at a temperature of 120°F. This slurry was introduced into the upper portion of column 5 which was 2 inches in diameter and 6 feet high wherein the solids settled to the lower portion of column 5. The upper 2 feet of column 5 were jacketed with heating jacket 10 through which heating fluid was passed to maintain the temperature of the upper portion of column 5 at 120°F. Water at 80°F was introduced via line 13 into the bottom of column 5 and thereafter rose upward through column 5 in countercurrent contact with the settled bed of terephthalic acid containing crystals. The water exited column 5 via line 8 carrying with it dissolved impurities which were mainly potassium benzoate.

The slurry of terephthalic acid containing material was removed from the lower portion of column 5 via line 9 and pump 17 at a rate sufficient to maintain the height of settled solid material in the lower portion of column 5 at about 20 inches above the bottom of column 5.

As previously mentioned, the upper portion of column 5 was maintained at a temperature of approximately 120°F by passing a heating medium through heating jacket 10. In addition, the lower portion of column 5 was maintained at a temperature of approximately 80°F by passing an appropriate heat exchange medium through heating jacket 14.

The slurry of terephthalic acid in water, which also contained unreacted potassium acid terephthalate and benzoic acid was pumped through heater 18 wherein it was heated to 190°F and the heated slurry was then introduced into the upper portion of column 19. Under the influence of the 190°F temperature, the benzoic acid and potassium acid terephthalate in the slurry dissolved in the water and, in the absence of appreciable amounts of potassium benzoate, reacted to produce additional quantities of terephthalic acid. The terephthalic acid introduced into column 19, as well as the terephthalic acid produced in column 19, settled in the form of solid material to the lower portion of column 19, thereby forming a bed in the lower portion of column 19. Water, at a temperature of approximately 100°F, was introduced via line 20 into the lower portion of column 19, ascended through the bed of solid material and washed the material free of impurities such as unreacted potassium acid terephthalate, benzoic acid and potassium benzoate formed in the reaction of the potassium acid terephthalate and benzoic acid. These impurities were removed from column 19 via line 21.

The reaction mixture from reactor 1 was introduced into column 5 at a uniform rate over a period of 12 hours. During this same 12-hour period a total of 12,000 grams of water was introduced into column 5 via line 13 at a uniform rate. Also, a slurry from the lower portion of column 5 was introduced into the upper portion of column 19 at a constant rate over a period of about 7 hours. During this same time a total of 3,750 grams of water was introduced into the lower portion of column 19 via line 20 at a constant rate.

During the course of the above-described experiment samples of the effluent streams of column 5, that is, streams 8 and 9, were taken and analyzed with the results set out in Table I and II below.

TABLE I (STREAM 8)

| Sample[1] No. | Total Solids,[2] grams | Solid TPA Content, grams | TPA Solids, Wt. % |
|---|---|---|---|
| 1 | 6.0156 | 0.6541 | 10.9 |
| 2 | 31.7663 | 2.1356 | 6.72 |
| 3 | 63.4126 | 3.6234 | 5.71 |
| 4 | 36.2025 | 3.0607 | 8.54 |
| 5 | 38.5651 | 3.1680 | 8.21 |
| 6 | 34.4933 | 2.8940 | 8.39 |
| 7 | 35.8681 | 2.9850 | 8.32 |
| 8 | 27.0782 | 2.6894 | 9.03 |
| 9 | 37.2014 | 3.7724 | 10.14 |
| 10 | 39.1810 | 3.7553 | 9.58 |
| 11 | 40.6344 | 3.5751 | 8.80 |
| 12 | 38.9386 | 3.5649 | 9.16 |
| 13 | 7.5064 | 0.5816 | 7.75 |

[1] Each sample consisted of 900 ml except 13 which was 200 ml. The 13 samples constitute the total overhead washings.
[2] Consists of both dissolved (principally potassium benzoate (KBZ) and undissolved solids (principally terephthalic acid (TPA).

The above data indicate the removal in stream 8 of a considerable quantity of potassium benzoate as tabulated under the column headed "Total Solids." From the grams listed in this column subtract the grams of terephthalic acid listed in the column headed "Solid TPA Content." The difference in the two amounts is the approximate total grams of potassium benzoate removed from column 5 via line 8.

TABLE II (STREAM 9)

| Sample[1] No. | Wt. % Solids | Ash[2], Wt. % |
|---|---|---|
| 1 | 10.9 | 19.8 |
| 2 | 8.5 | 19.1 |
| 3 | 7.7 | 16.8 |
| 4 | 6.3 | 21.6 |
| 5 | 5.8 | 18.8 |

[1] Each sample consisted of 1800 ml except 5 which was 2000 ml.
[2] Ash was determined by burning a sample of solids and measuring noncombustibles or ash. The ash derives from combined potassium acid terephthalate and potassium benzoate and of course constitutes an impurity in terephthalic acid. Feed to column 5 via pipe 6 contained 25 wt.% ash on same basis.

Also, during operation of the above-described experiment, samples of effluent streams from column 19, that is streams 21 and 28, were taken and analyzed with the following results set out in Table III and IV below.

TABLE III (STREAM 21)

| Sample No.[1] | Total Solids,[2] grams | Solid TPA grams | TPA Solids, Wt.% |
|---|---|---|---|
| 1 | 15.9246 | 3.8279 | 24.0 |
| 2 | 51.9828 | 8.4602 | 16.3 |
| 3 | 29.5746 | 5.5696 | 18.8 |
| 4 | 32.3812 | 5.0866 | 15.7 |
| 5 | 55.4300 | 6.9924 | 12.6 |
| 6 | 37.5153 | 4.6248 | 12.3 |
| 7 | 48.0607 | 13.6953 | 28.5 |
| 8 | 35.6283 | 10.1130 | 28.4 |
| 9 | 39.0367 | 14.4613 | 37.0 |
| 10 | 32.7350 | 11.6889 | 35.7 |
| 11 | 37.3122 | 12.1851 | 32.7 |
| 12 | 46.1942 | 13.9704 | 30.2 |
| 13 | 8.7466 | 0.5737 | 6.56 |

[1] Each sample equaled 900 ml except 5, 7, and 12 which were 950 ml and 13 which was 350 ml. The 13 samples constituted the total overhead stream 21.
[2] Consists of both dissolved (principally potassium benzoate (KBZ) and undissolved solids (principally terephthalic acid (TPA).

Thus considerable additional impurity was removed from the terephthalic acid crystals in wash column 19 as indicated in Table III by the weight of total solids less the weight of terephthalic acid.

TABLE IV (STREAM 28)

| Sample No. | Sample Volume, ml | Total Solids, grams | Solids, Wt.% | Ash, Wt.% |
|---|---|---|---|---|
| 1 | 200 | 20.8710 | 10.36 | 0.50 |
| 2 | 200 | 25.1277 | 11.86 | 0.76 |
| Intermediate | 900 | — | 12.05 | — |
| 3 | 175 | 23.0127 | 13.53 | 0.74 |
| 4 | 175 | 20.6777 | 12.45 | 0.84 |

The ash content is seen to have been reduced to only about 0.50 to 0.80 weight percent. Ash content of feed to the wash columns via pipe 6 was 25 weight percent. Hence the efficiency of the columns for removing ash or potassium containing impurities is evident.

The slurry product in the lower portion of column 19 contained an unmeasured amount of benzoic acid which was largely removed by passing the slurry to tank 30 wherein additional wash water was added and the mixture stirred for about 15 minutes at a temperature of 380°F. The resulting slurry was then passed through filter 32 and the crystal product contained in line 34 was again reslurried in water at 380°F. The final terephthalic acid crystals recovered by a second filtration contained only about 0.02 percent by weight benzoic acid and less than 10 parts per million potassium. An extremely high purity terephthalic acid product was thus produced.

Reasonable variations and modifications are possible within the scope of the foregoing disclosure without departing from the spirit and scope thereof.

Having thus described my invention that which is claimed is:

1. A process for recovering terephthalic acid from a first slurry thereof comprised of potassium benzoate, benzoic acid, potassium acid terephthalate and terephthalic acid, wherein said benzoic acid, said potassium acid terephthalate and said terephthalic acid are present in the undissolved state and said potassium benzoate is present in the dissolved state, which comprises introducing said mixture into a first purification zone having an upper portion and a lower portion wherein said first slurry separates, with the materials in said undissolved state settling to said lower portion of said first purification zone and being recovered therefrom as a second slurry and the material in said dissolved state accumulating in the upper portion of said first purification zone and being recovered therefrom, passing said second slurry comprised of benzoic acid, potassium acid terephthalate and terephthalic acid in the undissolved state to a heating zone wherein said second slurry is heated sufficiently to effect the dissolution of said benzoic acid and said potassium acid terephthalate thus to produce a third slurry comprised of benzoic acid and potassium acid terephthalate in the dissolved state and terephthalic acid in the undissolved state, introducing said third slurry into a second purification zone having an upper portion and a lower portion wherein said benzoic acid and said potassium acid terephthalate react in the presence of said terephthalic acid to produce a fourth slurry comprised of terephthalic acid in the undissolved state and potassium benzoate in the dissolved state and wherein said fourth slurry separates, with material in said undissolved state settling to said lower portion of said second purification zone and being recovered therefrom as a fifth slurry and the material in said dissolved state accumulating in the upper portion of said purification zone and being removed therefrom, and thereafter introducing said fifth slurry comprised essentially of terephthalic acid in the undissolved state into a drying zone wherein said terephthalic acid is recovered as a product of the process, and wherein the temperature in said upper portion of said first purification zone is maintained in the range of 100° to 150° F. which is higher than the temperature maintained in said lower portion of said first purification zone, wherein the temperature in said upper portion of said second purification zone is maintained in the range of 150° to 250° F. which is higher than the temperature maintained in said lower portion of said second purification zone, and wherein water is introduced into the lower portion of said first purification zone and said second purification zone whereby said water traverses said zones countercurrent to said material in said undissolved state so as to entrain material in said dissolved state and effect the removal thereof from the upper portions of said zones.

2. The process of claim 1 wherein the temperature in said upper portion of said first purification zone is maintained at about 120° F. and the temperature in said lower portion of said first purification zone is maintained at about 80° F.

3. The process of claim 1 wherein the temperature in said upper portion of said second purification zone is maintained at about 150° F. and the temperature in said lower portion of said second purification zone is maintained at about 100° F.

* * * * *